United States Patent
Wagner

(10) Patent No.: US 8,800,401 B2
(45) Date of Patent: Aug. 12, 2014

(54) TRANSMISSION GEAR ENGAGEMENT MECHANISM AND METHOD OF OPERATION

(75) Inventor: Jeremy J. Wagner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 265 days.

(21) Appl. No.: 13/056,690

(22) PCT Filed: Jul. 31, 2008

(86) PCT No.: PCT/US2008/071784
§ 371 (c)(1),
(2), (4) Date: Jan. 31, 2011

(87) PCT Pub. No.: WO2010/014100
PCT Pub. Date: Feb. 4, 2010

(65) Prior Publication Data
US 2011/0126659 A1    Jun. 2, 2011

(51) Int. Cl.
*F16D 23/06* (2006.01)

(52) U.S. Cl.
USPC .......................................................... 74/339

(58) Field of Classification Search
USPC ........ 74/339, 473.21, 473.36; 192/53.4, 63.9, 192/69.9, 109 R, 114 T, 108
See application file for complete search history.

(56) References Cited

U.S. PATENT DOCUMENTS

| | | | | |
|---|---|---|---|---|
| 1,766,153 A | * | 6/1930 | Trbojevich | 74/339 |
| 2,070,140 A | | 2/1937 | Peterson et al. | |
| 2,846,038 A | * | 8/1958 | Brownyer | 192/48.91 |
| 3,137,376 A | | 6/1964 | Schick | |
| 3,367,462 A | * | 2/1968 | Bibbens | 192/55.2 |
| 3,548,983 A | * | 12/1970 | Hiraiwa | 192/53.341 |
| 4,098,381 A | | 7/1978 | Mueller et al. | |
| 4,181,210 A | * | 1/1980 | Bibbens | 192/114 T |
| 4,776,228 A | * | 10/1988 | Razzacki et al. | 74/339 |

(Continued)

FOREIGN PATENT DOCUMENTS

DE    3939274 A1    5/1991
JP    57120729 A    7/1982

OTHER PUBLICATIONS

CN Decision of Rejection dated Sep. 12, 2013, English Translation (14 pages).

*Primary Examiner* — Troy Chambers
*Assistant Examiner* — Jude Agendia

(57) ABSTRACT

A transmission (12) for a vehicle (10) includes a gear shaft (24) having an external periphery (57) and a hub (54). The hub (54) is rotatably secured and axially moveably connected to the external periphery (57) of the gear shaft (24) and has a plurality of external teeth (62). The transmission (12) also includes a gear (56) connected to the gear shaft (24). An external periphery (66) of the gear defines teeth (67). The transmission further includes a shift collar (44) having a bore (64) through the shift collar (44). The shift collar (44) has internal teeth (65) that engage the teeth (62) of the hub (54). The gear and the shift collar (44) have a first configuration where all of the teeth (65) of the shift collar (44) are spaced from all of the teeth (67) of the gear (56) and a second configuration (70) where at least some teeth (65) of the shift collar (44) engage teeth (67) of the gear (56). The shift collar (44) defines a feature (71) for limiting the axial motion of the shift collar (44).

18 Claims, 6 Drawing Sheets

(56) References Cited

U.S. PATENT DOCUMENTS

| | | | | |
|---|---|---|---|---|
| 4,830,158 A * | 5/1989 | Uno et al. | | 192/53.34 |
| 4,830,159 A * | 5/1989 | Johnson et al. | | 192/53.32 |
| 4,875,566 A | 10/1989 | Inui et al. | | |
| 5,269,400 A * | 12/1993 | Fogelberg | | 192/53.34 |
| 5,538,119 A | 7/1996 | Johnson, Jr. | | |
| 5,626,214 A * | 5/1997 | Schlaich et al. | | 192/53.34 |
| 5,638,930 A * | 6/1997 | Parsons | | 192/53.32 |
| 5,664,654 A * | 9/1997 | Braun | | 192/48.91 |
| 5,695,033 A * | 12/1997 | Hiraiwa | | 192/53.32 |
| 6,719,111 B2 * | 4/2004 | Bengtsson et al. | | 192/53.32 |
| 6,739,443 B2 * | 5/2004 | Fernandez | | 192/53.341 |
| 6,766,707 B2 * | 7/2004 | Schupp | | 74/339 |
| 6,792,823 B2 * | 9/2004 | Takahashi et al. | | 74/431 |
| 6,974,012 B2 * | 12/2005 | Rau et al. | | 192/108 |
| 7,131,521 B2 * | 11/2006 | Coxon et al. | | 192/53.31 |
| 7,367,437 B2 * | 5/2008 | Buhlmaier et al. | | 192/53.32 |

\* cited by examiner

TRANSMISSION GEAR ENGAGEMENT MECHANISM AND METHOD OF OPERATION

FIELD OF THE INVENTION

The present invention relates to work machines and, more particularly, to transmissions used in such work machines.

BACKGROUND OF THE INVENTION

A work machine such as an agricultural tractor or a construction tractor may include an internal combustion (IC) engine which provides input power to a transmission, which in turn is coupled with and drives the rear axles through a rear end differential.

The transmissions on tractors are typical manual transmissions that provide several output speeds for a given input speed, each of these several output speeds are typically referred to as a gear, with each speed given a sequentially higher gear number with the slowest speed given the number 1 or called "first gear", etc. The different gears are provided by a series of transmission gears that are arranged to form a particular gear train that produces a particular speed or gear. The transmission includes multiple gears and shafts, with several gears mounted on each shaft. Not all of the gears are used in each gear train. Different gears are idle while the transmission is operating, depending on the gear selected. Shifting mechanisms axially move along the shaft to selectively alter the series of gears that are engaged to form different gear trains that each produce a particular gear or speed. Also, clutches may be placed in the gear train to idle portions of the shafts and gears.

One type of shifting mechanism is a shift collar. The shift collar is fitted around and rotatably connected to a hub that is rotatably connected to a shaft. A gear spins on the shaft and is fitted beside the collar. The shift collar has features that engage features on the gear when the collar is axially moved toward the gear, causing the gear to rotate with the shaft. When the collar is axially moved away from the gear, the features on the collar are spaced from the gear permitting the gear to spin on the shaft.

The collar may tend to be driven by the forces of the transmission as the collar engages the gear and may move excessively either toward or away from each other and may move out of engagement.

It should be appreciated that, for transmissions with large number of speeds, for example four or more speeds, the number of gears on each shaft and the number of shafts may be quite large. Further, for large tractors having large, powerful engines, the transmission gears must be quite large to transmit the forces generated by such powerful engines. Large numbers of gears and shafts and large sizes of shafts and gears, that are required for the large tractors with transmissions with many speeds, result in heavy, large transmissions. The tractors transport the large, heavy transmissions and may need to work within confined spaces in construction work sites or in agricultural applications. Further, the tractors may need to be transported on public highways.

What is needed in the art is a tractor with a transmission that is more reliable and permits the use of smaller, lighter weight, less expensive components.

SUMMARY OF THE INVENTION

The invention in one form is directed to a transmission for a vehicle, including a gear shaft having an external periphery and a hub. The hub has an internal wall defining a bore through the hub. The internal wall of the hub is rotatably secured and axially moveably connected to the external periphery of the gear shaft. The hub has an external periphery. At least a portion of the external periphery of the hub defines a plurality of teeth. The transmission also includes a shift collar and a gear. The shift collar has an internal wall defining a bore through the shift collar. The internal wall of the shift collar defines a plurality of teeth. At least some of the plurality of teeth of the shift collar matingly engage at least some of the plurality of teeth of the hub. The gear is rotatably moveably mounted to the gear shaft. The gear has an external periphery. At least a portion of the external periphery of the gear defines a plurality of teeth. The gear and the shift collar have a first configuration in which all of the plurality of teeth of the shift collar are spaced from all of the plurality of teeth of the gear and have a second configuration in which at least some of the plurality of teeth of the shift collar engage at least some of the plurality of teeth of the gear. The shift collar defines a feature for limiting the axial motion of the gear relative to the shift collar when the gear and the shift collar are in the second configuration.

DETAILED DESCRIPTION OF THE INVENTION

Figure 1:
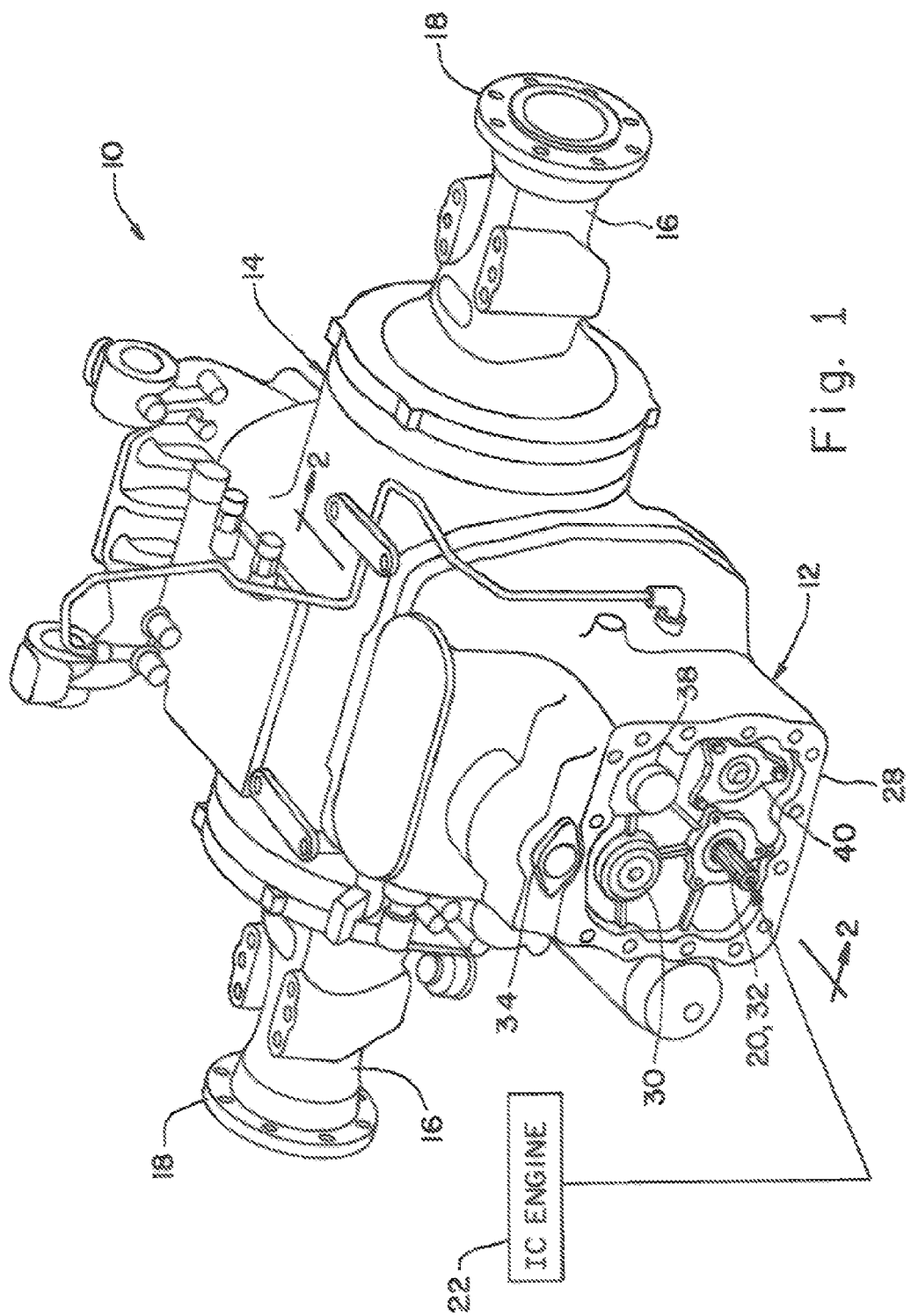
FIG. 1 is a perspective view of an embodiment of a transmission of the present invention used in an agricultural tractor.
Figure 2:
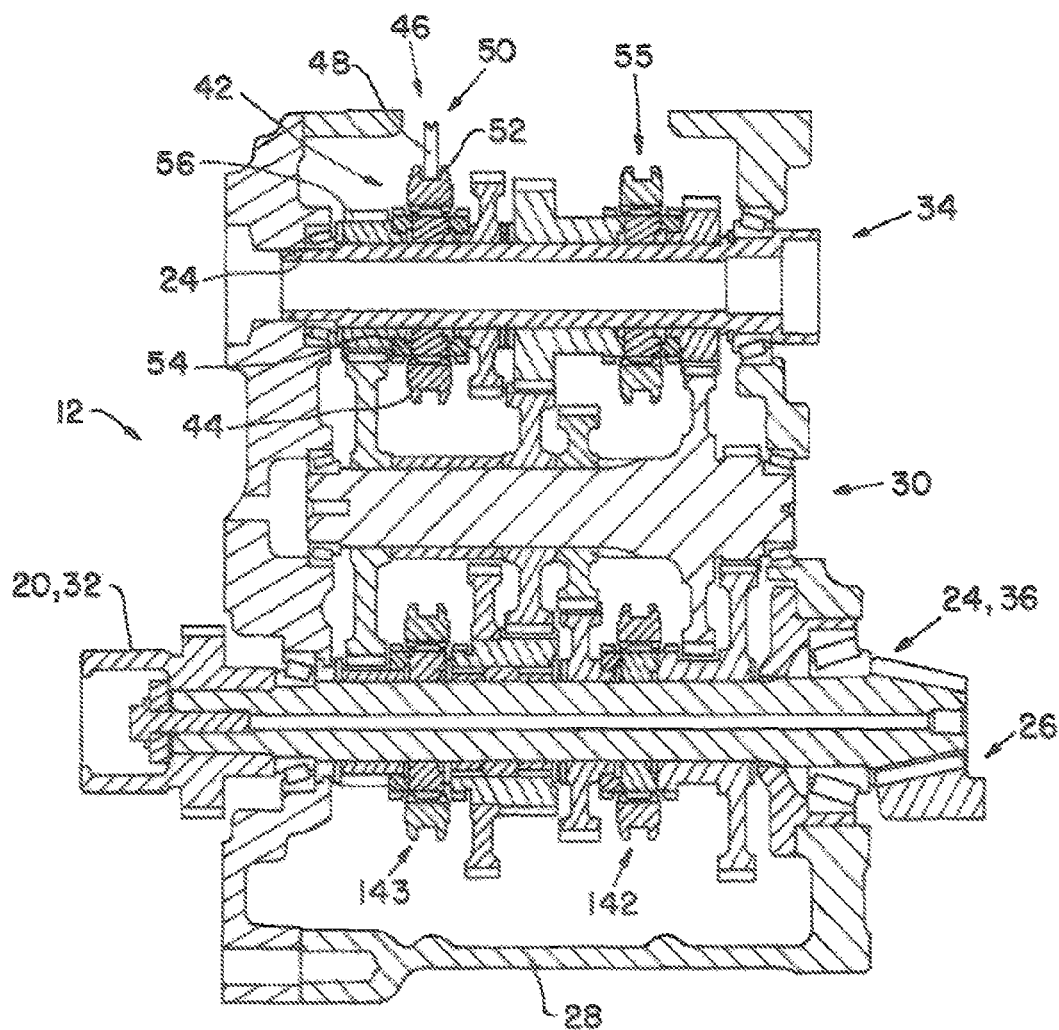
FIG. 2 is a side, sectional view through the transmission shown in FIG. 1, taken along line 2-2 in the direction of the arrows.

Referring now to the drawings, and more particularly to FIGS. 1 and 2, there is shown a portion of a work machine 10 in the form of an agricultural tractor, particularly the rear end drive train of the tractor. Although shown as an agricultural tractor, it is possible that work machine 10 could be in the form of a different type of work machine, such as a construction tractor or forestry machine.

Tractor 10 includes a transmission 12 which is coupled with a rear end differential 14, which in turn drives a pair of rear axles 16. Each rear axle 16 includes an outboard hub 18 to which a respective rear drive wheel (not shown) is mounted.

Transmission 12 includes a driven shaft 20 which is mechanically coupled with and receives rotational input power from IC engine 22, shown schematically in FIG. 1. Driven shaft 20 transfers rotational power via appropriate gearing to differential drive shaft or first gear shaft 124, which in turn extends from the rear of and provides rotational input power to rear end differential gear set 26 (see FIG. 2).

Driven shaft 20 extends through and is rotatably carried by housing 28, which likewise houses and rotatably carries a number of other components. Also positioned within and carried by housing 28 is a first idler arrangement 30 which mechanically interconnects a power input arrangement 32 to an auxiliary power output arrangement 34. The auxiliary power output arrangement 34 may be used, for example, to transfer power to a front differential (not shown) to drive the front wheels (not shown) for a work machine with four wheel drive.

As shown in FIG. 2, the transmission 12 includes a series of gears and shafts to provide a series of drive trains, each set of drive trains corresponding to one of the revolutionary output speeds or gears corresponding to a particular input speed for the tractor 10. The transmission 12 includes a series of gear arrangements, each including a shaft and a plurality of gears mounted onto the shaft, that cooperate with each other to form the respective drive trains. The transmission 12 includes the first idler arrangement 30, the power input arrangement 32, and the auxiliary power output arrangement 34. As shown in FIG. 1, the transmission 12 further includes a second idler arrangement 38 and a third idler arrangement 40. The invention may be practiced with fewer or more gear arrangements.

Referring to FIG. 2, auxiliary power output arrangement 34 includes an input shaft 36. The input shaft 36 receives input power from the first idler arrangement 30 coupled with IC engine 22. The terms power input arrangement 32 and auxiliary power output arrangement 34 are used relative to idler arrangement 30. That is, power input arrangement 32 provides input power to idler arrangement 30, and auxiliary power output arrangement 34 receives power input from idler arrangement 30 and provides power input to, for example, a front differential to drive the front wheels.

A portion of the transmission 12 is shown in cross section in FIG. 2. Three of the five gear arrangements, namely, the idler arrangement 30, the power input arrangement 32, and the auxiliary power output arrangement 34 are shown in cross-section. The second idler arrangement 38 and the third idler arrangement 40 are not shown in FIG. 2 and are only shown at their ends in FIG. 1. It should be appreciated that gears and shafts necessary for the second idler arrangement 38 and third idler arrangement 40 are well known in the art.

As shown in FIG. 2, the auxiliary power output arrangement 34 of the transmission 12 includes a first shifting assembly 42. As shown, the power input arrangement 32 of the transmission 12 includes a second shifting assembly 142 and a third shifting assembly 143 that will be described in greater detail later herein. The first shifting assembly 42 includes a shift collar 44 slidingly mounted onto shift hub 54. The first shifting assembly 42 provides for the axial shifting of the shift collar 44 so that the gear trains or gear arrangements may be changed by shifting the shift collar 44 axially from an engaged position to a disengaged position.

An actuator 46 cooperates with the shift collar 44 to urge the shift collar 44 axially along auxiliary output power shaft or second gear shaft 24. The actuator 46 includes a portion 48 configured to cooperate with external groove 50 formed in external periphery 52 of the shift collar 44. The actuator 46 may be any suitable actuator and may be mechanically driven, electrically driven, or a combination of mechanically, electrically, and hydraulically driven to move the shift collar 44 axially along second gear shaft 24. The shifting assembly 42 includes the shift collar 44 which is fitted onto shift hub 54. The shifting assembly 42 further includes a hub 54 and a first gear 56. The auxiliary power output arrangement 34 of the transmission 12 also includes a fourth shifting assembly 55, similar to the first shifting assembly 42.

Figure 3:
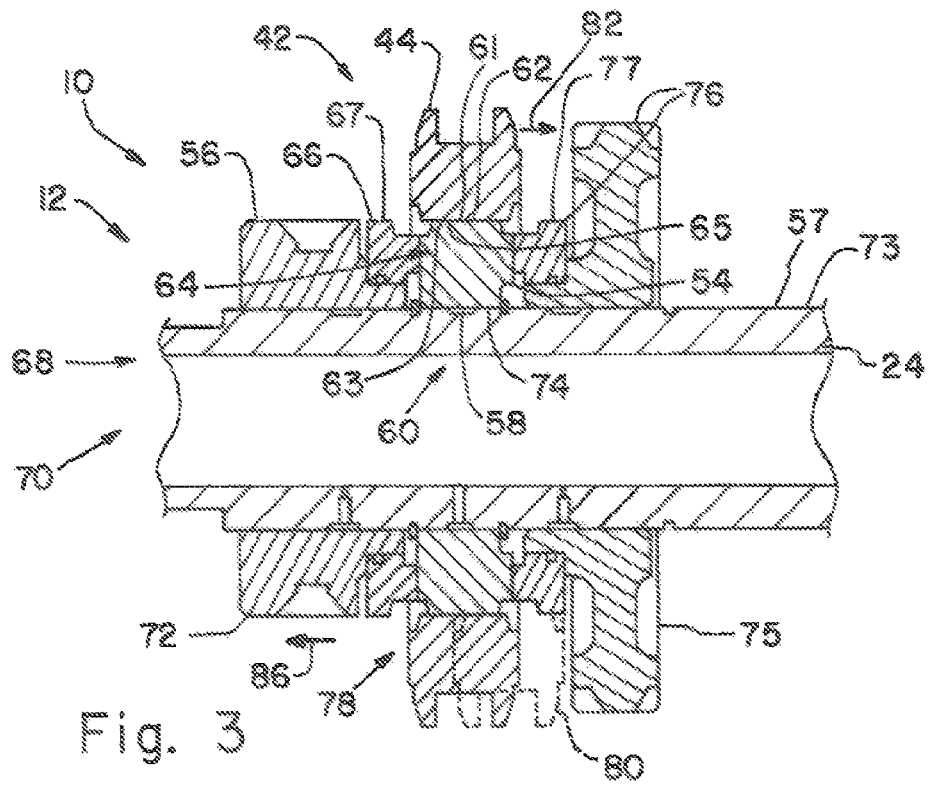
FIG. 3 is a partial sectional plan view of the transmission shown in FIG. 2, showing a shifting assembly according to the present invention with the shifting assembly in a disengaged configuration.

Referring now to FIG. 3, the first shifting assembly 42 is shown in greater detail. The shifting assembly 42 serves to selectively engage and disengage the first gear 56 to provide for alternate speeds or gears in the transmission 12. The gear shaft 24 includes an external periphery 57. The hub 54 has an internal wall 58 defining a bore 60 through the hub 54. The internal wall 58 of the hub 54 is rotatably secured and axially movably connected to the external periphery 57 of the gear shaft 24. The hub 54 has an external periphery 61 of the hub 54. At least a portion of the external periphery 61 of the hub 54 defines a plurality of external teeth 62.

The shift collar 44 has an internal wall 63 which defines a bore 64 through the shift collar 44. The internal wall 63 of the shift collar 44 defines a plurality of teeth 65. At least some of the plurality of teeth 65 of the shift collar 44 matingly engage at least some of the plurality of teeth 62 of the hub 54.

The first gear 56 is rotatably movably mounted and axially movably connected to the gear shaft 24. The first gear 56 has an external periphery 66 of the first gear 56. At least a portion of the external periphery 66 of the first gear 56 defines a plurality of first teeth 67. The first gear 66 and the shift collar 44 of the shifting assembly 42 have a first configuration 68, as shown in FIG. 3, in which all of the plurality of teeth 65 of the shift collar 44 are spaced from all of the plurality of first teeth 67 of the first gear 56.

Figure 4:
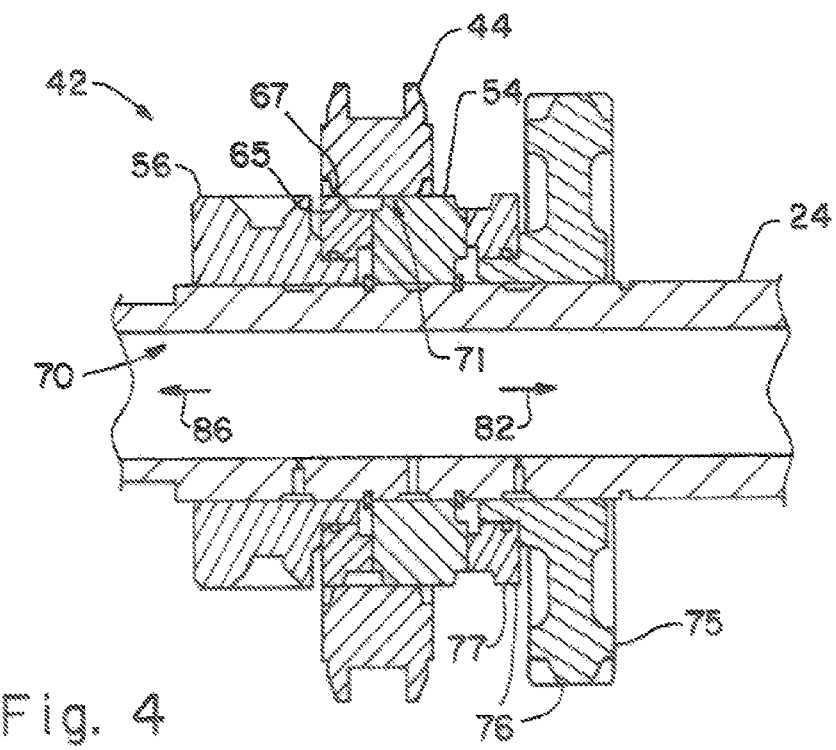
FIG. 4 is a partial sectional plan view of the transmission shown in FIG. 2, showing the shifting assembly of FIG. 2 in an engaged configuration.

Referring now to FIG. 4, the first gear 56 and the shift collar 44 of the shifting assembly 42 have a second configuration 70 in which at least some of the plurality of teeth 65 of the shift collar 44 engage at least some of the plurality of first teeth 67 of the first gear 56. The shift collar 44 defines a feature 71 for limiting the axial motion of the first gear 56 relative to the shift collar 44 when the first gear 56 and shift collar 44 are in the second configuration 70. In the second configuration 70 of the shift collar 44 and the first gear 56, all of the plurality of teeth 65 of the shift collar 44 engage all of the plurality of first teeth 67 of the first gear 56. It should be appreciated that alternatively some of the teeth may engage other teeth and some of the teeth may not engage other teeth. It should be appreciated that the shift collar 44 of the shifting assembly 42 is moved from first configuration 68 of the shift collar 44 and the first gear 56 to second configuration 70 of the shift collar 44 and the first gear 56 by moving the shift collar 44 in the direction of arrow 86.

Referring again to FIG. 3, the plurality of first teeth 67 of the first gear 56 define a plurality of spline teeth. The external periphery 66 of the first gear 56 further defines a plurality of gear teeth 72. The plurality of gear teeth 72 are used to transfer power to or from the gear shaft 24 and are used for providing a portion of a gear train for at least one of the speeds or gears of the transmission 12. The plurality of gear teeth 72 of the first gear 56 have a tooth pitch and the plurality of first teeth 67 of the first gear 56 have a tooth pitch, the respective pitches may be identical or different from each other.

The external teeth 62 of the hub 54, the first teeth 67 of the first gear 56, and the teeth 65 of the shift collar 44 are in the form of spline teeth. The spline teeth may be an involute tooth shape or may have a different tooth shape.

As shown in FIG. 3, at least a portion of the external periphery 57 of the gear shaft 24 defines a plurality of external teeth 73. Similarly at least a portion of the internal wall 58 of the hub 54 defines a plurality of second internal teeth 74. The second internal teeth 74 of the hub 54 engage the plurality of external teeth 73 of the gear shaft 24. The teeth 73 and 74 may have any suitable shape and, as shown, are in the form of spline teeth. The teeth 73 and 74 may, for example, be in the form of involute spline teeth. The teeth 73 and 74 may include missing teeth and the teeth 73 and 74 may have any suitable shape.

Continuing to refer to FIG. 3, the shifting assembly 42 further includes a second gear 75 rotatably movably mounted to the gear shaft 24. The second gear 75 has an external periphery 76 of the second gear 75. At least a portion of the external periphery 76 of the second gear 75 defines a plurality of first teeth 77. The second gear 75 and the shift collar 44 have a first configuration 78 as shown in solid lines. In the first configuration 78 of the second gear 75 and the shift collar 44, the plurality of teeth 65 of the shift collar 44 are spaced from all of the plurality of first teeth 77 of the second gear 75.

The second gear 75 and the shift collar 44 of the shifting assembly 42 also have a second configuration 80, shown as dashed lines, in which at least some of the plurality of teeth 65 of the shift collar 44 engage at least some of the plurality of first teeth 77 of the second gear 75. It should be appreciated that some or, as shown in FIG. 4, all of the plurality of first teeth 77 of second gear 75 engage all of the plurality of teeth 65 of shift collar 44. The feature 71 of the shift collar 44 limits the axial motion of the shift collar 44 when the second gear 75 and the shift collar 44 are in the second configuration 80 of the shift collar 44 and the second gear 75.

Figure 5:
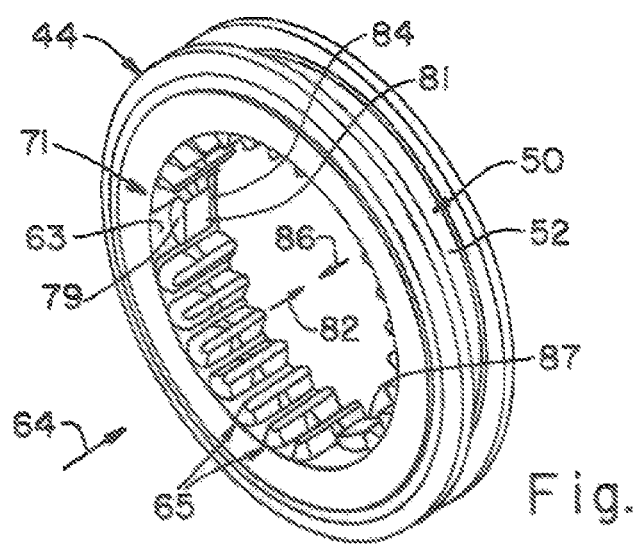
FIG. 5 is a perspective view of the shift collar of the shifting assembly of FIG. 3 showing axial movement limiting features in the form of stops.
Figure 6:
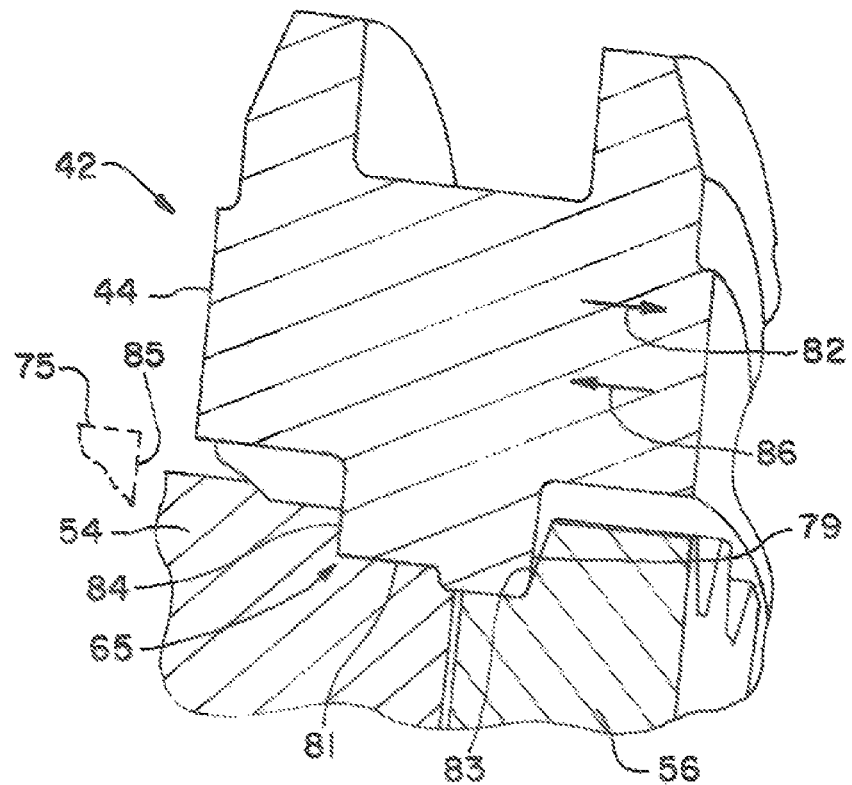
FIG. 6 is a partial perspective sectional view of the shifting assembly of FIG. 3, showing the gear engaging the stop of the collar to limit its axial motion along the shaft.

Referring now to FIGS. 5 and 6, the shift collar 44 is shown in greater detail with a form of the feature 71. As shown in FIG. 5, the feature 71 of the shift collar 44 is in the form of a positive stop extending from the internal wall of the shaft collar 44. The feature 71 may include a first stop 81 positioned between two of the plurality of gear teeth 65 of the shift collar 44. The first stop 81 may have any suitable shape so as to limit the axial motion of shift collar 44 in the direction of arrow 82.

Referring now to FIG. 6, the collar 44 is shown engaged with first gear 56 as well as with hub 54 of the shifting assembly 42. FIG. 6 is a rear view and, as such, components appear to be in reverse order to that of FIGS. 3-5. The first stop 81 includes a first face 79 engaging face 83 of the first gear 56. The first stop 81 further includes a second face 84 opposed to the first face 79 and positioned between two of the plurality of gear teeth 65 of the shift collar 44. The second face 84 of the first stop 81 conforms to surface 85 of the second gear 75 (shown in dashed lines) and limits the motion of collar 44 in the direction of arrow 86.

Referring again to FIG. 5, the feature 71 of the shifting assembly 42 further includes a second stop 87 spaced from the first stop 81. The second stop 87 may be similar or identical to the first stop 81. The first stop 81 and the second stop 87 may have any suitable shape and, for simplicity, both stops 81 and 87 have the opposed faces 79 and 84 and a generally concave portion between the faces 79 and 84. The feature 71 of shift collar 44 further includes a third stop (not shown) similar to stops 81 and 87. The third stop is positioned equally spaced between the first stop 81 and the second stop 87.

Figure 7:
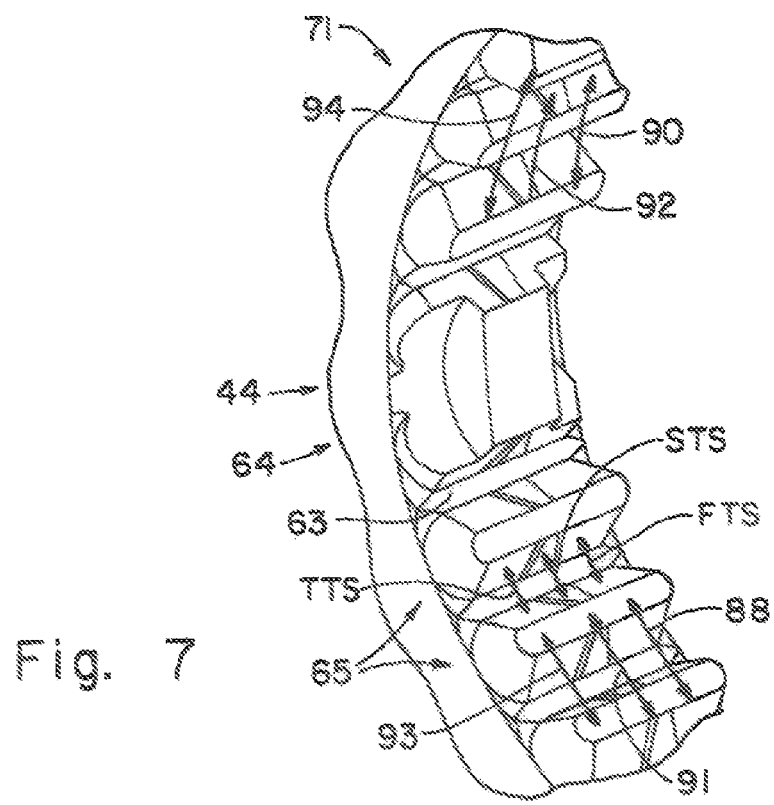
FIG. 7 is a partial perspective view of the shift collar of the shifting assembly of FIG. 3 showing axial movement limiting features in the form of three separate internal tooth portions of the internal teeth on the shift collar, with the middle portion having smaller tooth space widths.

Referring now to FIG. 7, the first feature 71 may be in the form of the shape of the plurality of teeth 65 of the shift collar 44 with a middle portion of the teeth being thicker to assist one of the gears 56 and 75 to maintain engagement with the shift collar 44. The shift collar 44 includes the plurality of teeth 65 having a first portion 88, defining a first set of teeth 90 that has a first tooth space width FTS between adjacent teeth and a second portion 91, defining a second set of teeth 92 that has a second tooth space width STS between adjacent teeth. The first tooth space width FTS is greater than the second tooth space width STS. The portions 88 and 91 of the plurality of teeth 65 define the feature 71. The portions 88 and 91 assist in keeping the first gear 56 in engagement with the shift collar 44 under load.

The plurality of teeth 65 of the shift collar 44 further include a third portion 93 that serves as a part of the feature 71. The third portion 93, together with the second portion 91, assists the second gear 75 to maintain engagement with shift collar 44 under load. The third portion 93 defines a third set of teeth 94 of the plurality of teeth 65. The third set of teeth 94 has a third tooth space width TTS between adjacent teeth. The first tooth space width FTS and the third tooth space width TTS are greater than the second tooth space width STS. The first set of teeth 90, the second set of teeth 92, and the third set of teeth 94 define the feature 71.

Figure 8:
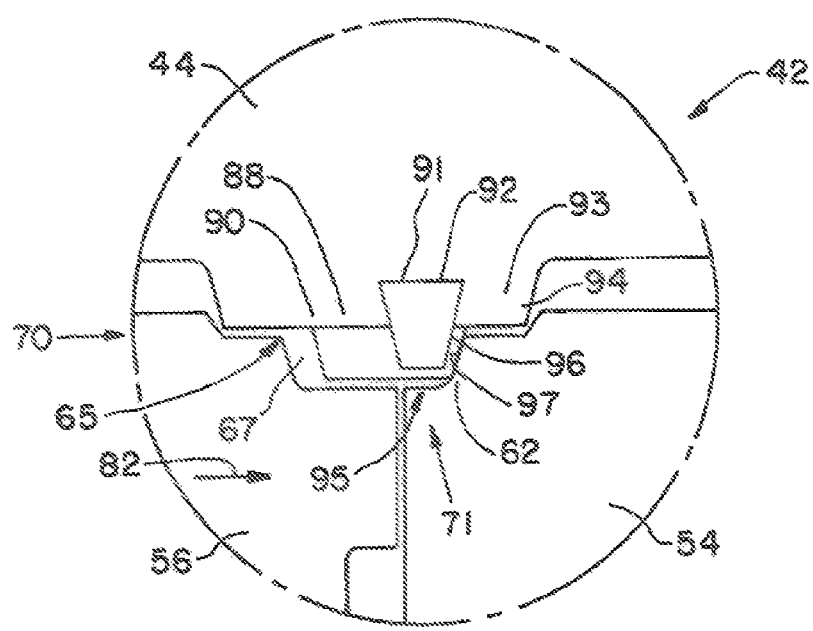
FIG. 8 is a partial sectional view of the shifting assembly of FIG. 3, showing the gear engaging one of the smaller end portions of three separate internal tooth portions of the internal teeth on the shift collar and the hub engaging the other one of the smaller end portions of three separate internal tooth portions of the internal teeth, with the thicker portion of three separate internal tooth portions of the internal teeth on the shift collar inhibiting the collar and the gear from disengagement with each other.

Referring now to FIG. 8, the feature 71 in the form of internal teeth 65 of the collar 44 with the three separate portions 88, 91, and 93 is shown in cooperation with the first gear 56 and the hub 54. The collar 44, hub 54, and first gear 56 are shown with the shifting assembly 42 in second configuration 70 with the shift collar 44 engaging the first gear 56. The first portion 88 of the teeth 65 of collar 44 including the first set of teeth 90 of the teeth 65 of the collar 44 engages the spline teeth 67 of the first gear 56 and the third portion 93 of the teeth 65 of collar 44 including the third set of teeth 94 of the teeth 65 of the collar 44 engages the external teeth 62 of the hub 54. The second portion 91 of the second set of teeth 92 of the external teeth 65 of the collar 44 are positioned in void 95 located between the spline teeth 67 of the first gear 56 and the teeth 62 of the hub 54. Since the second tooth space width STS is greater than the first tooth space width FTS and third tooth space width TTS, the second set of teeth 92 are thicker than the first set of teeth 90 and the third set of teeth 94. The second set of teeth 92, therefore, define a step or raised surface 96 which engages outer edge 97 of the teeth 62 of the hub 54 inhibiting the movement of the shift collar 44 in the direction of arrow 82 out of engagement with the first gear 56.

Figure 9:
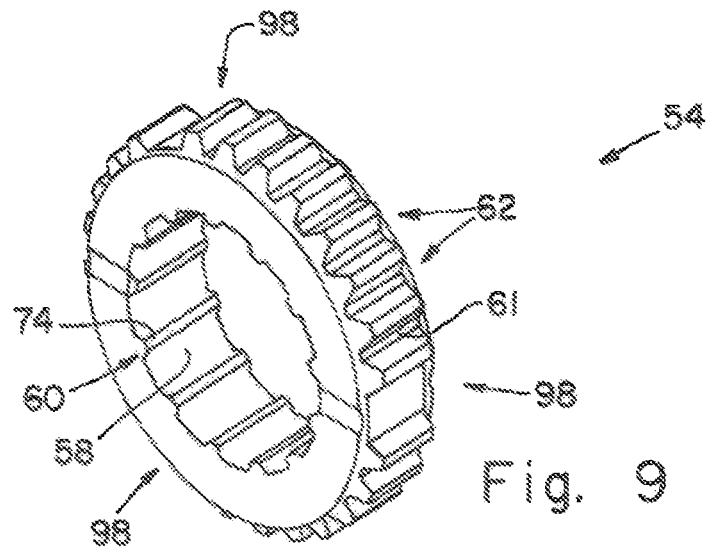
FIG. 9 is a perspective view of the hub of the shifting assembly of FIG. 3.

Referring now to FIG. 9, the hub 54 is shown in greater detail. The hub 54 includes the plurality of external teeth 62 formed on external periphery 61 of the hub 54. The plurality of external teeth 62 includes three spaced apart portions 98 with missing teeth. The hub 54 further includes the internal wall 58 defining the bore 60. The internal wall defines internal teeth 74 of the hub 54. The internal teeth 74 may be in the form of an involute spline and has more than one missing spline tooth between adjacent spline teeth 74 of the hub 54. The external teeth 62 and the internal teeth 74 of the hub 54 may have any suitable tooth form.

Referring again to FIGS. 3 and 4, the shifting assembly 42 provides three different power flows depending on whether the shift collar 44 and the first gear 56 are in first configuration 68, in which the teeth 65 of the shift collar 44 are spaced from the teeth 67 of the first gear 56 (which is the same shift collar position as the first configuration 78 of the teeth 65 of the shift collar 44 and the first teeth 77 of the second gear 75), whether the shift collar 44 and the first gear 56 are in the second configuration 70, in which the teeth 67 of the first gear 56 engage the teeth 65 of the shift collar 44, or whether the shift collar 44 and the second gear 75 are in second configuration 80, in which the teeth 65 of the shift collar 44 engage the first teeth 77 of the second gear 75. In the first configuration 68 of the shift collar 44 and the first gear 56, as shown in FIG. 3, the gear shaft 24 rotates. The teeth 73 of the gear shaft 24 engage the internal teeth 74 of the shift hub 54, causing the shift collar 44 to rotate in the same direction as the gear shaft 24. In the first configuration 68 of collar 44 and first gear 56, the gear shaft 24 is free to spin inside the bores of the first gear 56 and the second gear 75, permitting the first gear 56 and the second gear 75 to remain idle.

The shift collar 44 may be moved axially along the gear shaft 24 in the direction of arrow 86 to second configuration 70 of the shift collar 44 and the first gear 56, as shown in FIG. 4. In the second configuration 70 of the shift collar 44 and the first gear 56, the gear shaft 24 rotates. The teeth 73 of the gear shaft 24 engage the internal teeth 74 of the shift hub 54, causing the shift collar 44 to rotate in the same direction as the gear shaft 24. In the second configuration 70 of collar 44 and first gear 56, the teeth 65 of the shift collar 44 engage the spline teeth 67 of first gear 56, causing the first gear 56 to rotate in the same direction as shift collar 44 and the gear shaft 24. The gear shaft 24 is free to spin inside the bore of the second gear 75, permitting the second gear 75 to remain idle.

The shift collar may be moved axially along the gear shaft 24 in the direction of arrow 82 to second configuration 80 of the shift collar 44 and the second gear 75, shown as dashed lines in FIG. 4. In the second configuration 80 of the shift collar 44 and the second gear 75, the gear shaft 24 rotates. The teeth 73 of the gear shaft 24 engage the internal teeth 65 of the shift collar 44, causing the shift collar 44 to rotate in the same direction as the gear shaft 24. In the second configuration 80 of the shift collar 44 and the second gear 75, the teeth 65 of the shift collar 44 engage the spline teeth 77 of second gear 75 causing the second gear 75 to rotate in the same direction as shift collar 44 and the gear shaft 24. The gear shaft 24 is free to spin inside the bore of the first gear 56, permitting the first gear 56 to remain idle.

Figure 10:
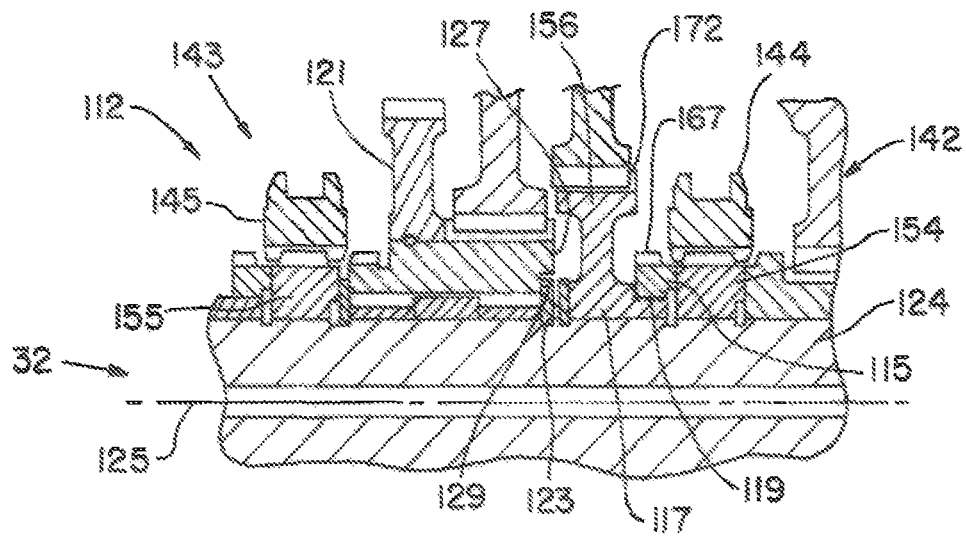
FIG. 10 is a partial sectional plan view of the transmission shown in FIG. 2, showing a second shifting assembly according to the present invention utilizing a welded gear assembly and showing a third shifting assembly according to the present invention utilizing a thrust washer gear assembly with an undercut gear face for receiving the thrust washer.

Referring now to FIG. 10, the second shifting assembly 142 and the third shifting assembly of the transmission 12 are shown in greater detail. The second shifting assembly 142 and the third shifting assembly 143 are a part of the power input arrangement 32. The second shifting assembly 142 and the third shifting assembly 143 are similar to the first shifting assembly 42 of FIGS. 4-9. The second shifting assembly 142 includes a first shift collar 144, a first hub 154, a gear shaft 124, and a first gear 156.

The first gear 156 includes first teeth 167 in the form of spline teeth. The first gear 156 includes a first portion 115 and a second portion 117. The first portion 115 includes the spline teeth 167 and the second portion 117 includes gear teeth 172. The second portion 117 of the first gear 156 is welded at welding area 119 to the first portion 115 of the first gear 156. Welding of portions 115 and 117 together permits the gear teeth 172 and the spline teeth 167 to be positioned axially closer together than if the first gear 156 were made of a unitary construction with the first portion 115 integral with the second portion 117. The welding of first gear 156 permits the first gear 156 to have a shorter axial length than if machined as a unitary component. Manufacturing methods for making the spline teeth 167 and the gear teeth 172 require tool clearance portions on the gears for accommodating cutting tools (not shown) for machining the spline teeth 167 and the gear teeth 172. The clearance portion for the cutting tools results in the first gear 156 having an added axial length. The use of the welding area 119 on the first gear 156 obviates the need for the clearance portion for the cutting of the teeth 167 and 172. Therefore, the first gear 156, when made of a welded assembly, may have a shorter axial length than otherwise necessary, permitting the transmission to be more compact.

The third shifting assembly 143 includes a second gear 121, a second shift collar 145, a second hub 155 and the gear shaft 124. The shifting assembly 143 further includes a thrust washer 123. The second gear 121 defines an axis of rotation 125 of the second gear 121. The second gear 121 defines a first face in the form of end face 127 normal to the axis of rotation 125 of the second gear 121. The second gear 121 defines a second face in the form of a recessed face 129, recessed from the end face 127 of the second gear 121. The recessed face 129 is configured to contact the thrust washer 123. By providing the recessed face 129, the thrust washer 123 may be utilized with the second gear 121 without having most of the thickness of the thrust washer 123 added to the axial length of the shifting assembly 143. The transmission 112 may, therefore, be positioned in a shorter housing and may be made generally smaller and more compact. The gear with the recessed face, the welded gear assembly, and the stop collar with the stops and the thicker tooth portions may all be utilized in the same transmission to work in concert to provide a smaller and more compact transmission.

Having described the preferred embodiment, it will become apparent that various modifications can be made without departing from the scope of the invention as defined in the accompanying claims.

The invention claimed is:

1. A transmission for a work machine, comprising:
   a gear shaft having an external periphery;
   a hub having an internal wall defining a bore therethrough, the internal wall of said hub rotatably secured and axially moveably connected to the external periphery of said gear shaft, said hub having a single unitary external periphery thereof, at least a portion of the single unitary external periphery of said hub defining a plurality of teeth;
   a gear rotatably moveably mounted to said gear shaft, said gear having an external periphery thereof, at least a portion of the external periphery of said gear defining a plurality of teeth; and
   a shift collar having an internal wall defining a bore therethrough, the internal wall of said shift collar defining a plurality of teeth, at least some of the plurality of teeth of said shift collar matingly engaging at least some of the plurality of teeth of said hub, said gear and said shift collar having a first configuration in which all of the plurality of teeth of said shift collar are spaced from all of the plurality of teeth of said gear and having a second configuration in which at least some of the plurality of teeth of said shift collar engage at least some of the plurality of teeth of said gear, said shift collar defining a feature protruding away from the internal wall and towards a central axis of the shift collar for limiting the axial motion of said shift collar relative to said gear when said gear and said shift collar are in the second configuration, wherein the plurality of teeth of said shift collar define a first portion having a first set of teeth, the first set of teeth having a first circumferential tooth space width between adjacent teeth, and a second portion defining a second set of teeth, the second set of teeth having a second circumferential tooth space width between adjacent teeth, the first circumferential tooth space width being greater than the second circumferential tooth space width forming steps between the first set of teeth and the second set of teeth, the first set of teeth and second set of teeth defining the feature, the feature configured to assist in deterring said gear and said shift collar from returning to the first configuration, the feature comprising a stop positioned between two of the plurality of gear teeth of said shift collar, the stop protruding away from the internal wall and towards the central axis of the shift collar, and an axial width of the stop being less than an axial width of the plurality of gear teeth.

2. The transmission of claim 1, wherein the feature further comprises a second stop spaced from the first mentioned stop, the second stop protrudes away from the internal wall and towards the central axis, and an axial width of the second stop is less than the axial width of the plurality of gear teeth.

3. The transmission of claim 1, wherein the stop includes a first face engaging a surface of said gear.

4. The transmission of claim 3, further comprising a second gear, the feature configured to prohibit said shift collar from further advancement toward the second gear beyond that of the second configuration.

5. The transmission of claim 1, further comprising a second gear rotatably moveably mounted to said gear shaft, said second gear having an external periphery thereof, at least a portion of the external periphery of said second gear defining a plurality of teeth, said second gear and said shift collar having a first configuration in which all of the plurality of teeth of said shift collar are spaced from all of the plurality of teeth of said second gear and having a second configuration in which at least some of the plurality of teeth of said shift collar engage at least some of the plurality of teeth of said second gear, the feature of said shift collar limiting the axial motion of said shift collar when said second gear and said shift collar are in the second configuration.

6. The transmission of claim 5, wherein the plurality of teeth of said shift collar define a third portion defining a third set of teeth, the third set of teeth having a third circumferential tooth space width between adjacent teeth, the third circumferential tooth space width being greater than the second circumferential tooth space width forming steps between the second set of teeth and the third set of teeth, the first set of teeth, the second set of teeth, and the third set of teeth defining the feature, the feature configured to assist in deterring said second gear and said shift collar from returning to the first configuration thereof.

7. The transmission of claim 1, wherein the plurality of teeth of said gear defines a plurality of spline teeth, the external periphery of said gear further defines a plurality of gear teeth.

8. The transmission of claim 7, wherein the plurality of gear teeth have a tooth pitch and the plurality of spline teeth of said gear have a tooth pitch different than the tooth pitch of the plurality of gear teeth.

9. The transmission of claim 1, wherein the teeth of said hub, the teeth of said gear, and the teeth of said shift collar comprise spline teeth.

10. The transmission of claim 1, wherein at least a portion of the external periphery of said gear shaft defines a plurality of teeth, at least a portion of the internal wall of said hub defines a plurality of second teeth, at least some of the plurality of second teeth of said hub engaging at least some of the plurality of teeth of said gear shaft.

11. The transmission of claim 10, wherein at least a portion of the single unitary external periphery of said hub defines a plurality of involute spline teeth.

12. The transmission of claim 1, wherein said shift collar has an external periphery thereof, a portion of the external periphery of said shift collar defining an external groove therein.

13. The transmission of claim 1, further comprising an actuator for cooperation with said shift collar to urge said shift collar axially along the gear shaft.

14. The transmission of claim 1, further comprising an actuator, said shift collar having an external periphery thereof, a portion of the external periphery of said shift collar defining an external groove therein, said actuator cooperating with said shift collar to urge said shift collar axially along the gear shaft, said actuator including a portion configured to cooperate with the portion of the external periphery of said hub defining the external groove.

15. The transmission of claim 1, wherein the teeth of said gear comprise spline teeth, said gear includes a first portion and a second portion, first portion including the spline teeth and the second portion including gear teeth, a weld joins the second portion of said gear to the first portion of said gear.

16. The transmission of claim 1, further comprising a thrust washer, said gear defines an axis of rotation thereof, said gear defines a first face normal to the axis of rotation thereof, and said gear defines a second face recessed from the first face of said gear, said second face configured to contact said trust washer.

17. A work machine, comprising:
an engine; and
a transmission coupled with said engine, said transmission including:
a gear shaft having an external periphery;
a hub having an internal wall defining a bore therethrough, the internal wall of said hub rotatably secured and axially moveably connected to the external periphery of said gear shaft, said hub having a single unitary external periphery thereof, at least a portion of the external periphery of said hub defining a plurality of teeth;
a gear rotatably moveably mounted to said gear shaft, said gear having an external periphery thereof, at least a portion of the external periphery of said gear defining a plurality of teeth; and
a shift collar having an internal wall defining a bore therethrough, the internal wall of said shift collar defining a plurality of teeth, at least some of the plurality of teeth of said shift collar matingly engaging at least some of the plurality of teeth of said hub, said gear and said shift collar having a first configuration in which all of the plurality of teeth of said shift collar are spaced from all of the plurality of teeth of said gear and having a second configuration in which at least some of the plurality of teeth of said shift collar engage at least some of the plurality of teeth of said gear, said shift collar defining a feature for limiting the axial motion of said shift collar relative to said gear when said gear and said shift collar are in the second configuration, wherein the plurality of teeth of said shift collar define a first portion having a first set of teeth, the first set of teeth having a first circumferential tooth space width between adjacent teeth, and a second portion defining a second set of teeth, the second set of teeth having a second circumferential tooth space width between adjacent teeth, the first circumferential tooth space width being greater than the second circumferential tooth space width forming steps between the first set of teeth and the second set of teeth, the first set of teeth and second set of teeth defining the feature, the feature configured to assist in deterring said gear and said shift collar from returning to the first configuration, the feature comprising a stop positioned between two of the plurality of gear teeth of said shift collar, the stop protruding away from the internal wall and towards the central axis of the shift collar, and an axial width of the stop being less than an axial width of the plurality of gear teeth.

18. The work machine of claim 17, wherein the feature is configured to prohibit said shift collar from further advancement toward the second gear beyond that of the second configuration.

* * * * *